XR 3,573,669

United St

[11] 3,573,669

[72] Inventor Emmanuel P. Papadakis
Allentown, Pa.

[21] Appl. No. 756,770
[22] Filed Sept. 3, 1968
[45] Patented Apr. 6, 1971

[73] Assignee Bell Telephone Laboratories, Incorporated
Murray Hill, N.J.

[54] DISPERSIVE DELAY CELL USING ANISOTROPIC MEDIUM
8 Claims, 4 Drawing Figs.

[52] U.S. Cl. ........ 333/30, 333/72, 310/8.3
[51] Int. Cl. ........ H03h 9/30, H01v 7/02
[50] Field of Search ........ 333/30, 72; 310/9.5, 9.7—9.8

[56] References Cited

UNITED STATES PATENTS

| | | | |
|---|---|---|---|
| 2,512,130 | 6/1950 | Arenberg | 333/30 |
| 2,712,638 | 7/1955 | Arenberg | 333/30 |
| | | ...ortley | 310/9.7 |
| 3,387,233 | 6/1968 | Parker, Jr. | 333/72X |
| 3,387,235 | 6/1968 | Fair | 333/30 |
| 3,401,360 | 9/1968 | DuBois | 310/9.8X |

FOREIGN PATENTS

| | | | |
|---|---|---|---|
| 988,102 | 4/1965 | Great Britain | 333/30 |

OTHER REFERENCES

Schelkunoff, S. A., " Electromagnetic Waves," Chapt. IX, Radiation and Diffraction, pp. 342— 345 Van. Nostrand Co, 1943, QC 661 S3

Bechman et al., " Thickness Modes of Plates Excited Piezoelectrically," Report #2 Part II of "Piezoelectricity," General Post Office Selected Eng. Reports, Her Majesty' s Stationary Office, 1957, pp. 41, QC 595 G7

Fagen, M. D., " Performance of Ultrasonics Silica Delay Lines," Proc. Nat. Electronics Conf., 7, 1951, pp. 380— 389

*Primary Examiner*—Eli Lieberman
*Assistant Examiner*—William H. Punter
*Attorneys*—R. J. Guenther and Arthur J. Torsiglieri

ABSTRACT: An elastic wave dispersive delay cell which uses a cell body of an elastically anisotropic delay medium and a pair of spaced transducer arrays disposed on opposing parallel surfaces of the body to achieve nonlinear dispersion.

3573669
OR IN 333/30R

2 Sheets-Sheet 1

INVENTOR
E. P. PAPADAKIS
BY
ATTORNEY

DISPERSIVE DELAY CELL USING ANISOTROPIC MEDIUM

This invention relates to a dispersive elastic wave delay cell which uses an anisotropic delay medium.

BACKGROUND OF THE INVENTION

Dispersive delay cells are useful in a variety of spectrometers and radar systems. In such applications, it is typically desired to compress or expand an electromagnetic signal. This is accomplished by introducing suitably different delays for different frequency components of the signal.

A typical prior art dispersive delay cell, such as that described by W. S. Mortley in British Pat. No. 988,102, filed Aug. 3, 1962, comprises a body of an isotropic elastic wave supporting medium, such as fused quartz, an array of unequally spaced transducers for launching an elastic wave into the body, and an elastic wave receiving transducer. The position of the transducer array and the spacings between adjacent transducers of the array are chosen to subject elastic waves of different frequencies reaching the receiving transducer to different delays depending upon their frequency.

One disadvantage of this type of delay cell is that it uses an isotropic elastic wave delay medium. There is a serious limitation in the availability of isotropic delay media having low velocity, low absorption and low cost. Moreover, the absorption of typical isotropic media increases significantly at frequencies above about 150 megahertz; consequently the operation of delay cells using isotropic media at high frequencies is inefficient.

SUMMARY OF THE INVENTION

A dispersive delay cell, according to the present invention, uses an anisotropic delay medium, such as a pure crystal, to achieve dispersion. In particular, an elastic shear wave launched from a spaced array of transducers such that it is polarized parallel to the two-fold symmetry axis of an anisotropic medium will propagate through the medium with a wave velocity which is a function of the propagation direction in the plane normal to the symmetry axis.

BRIEF DESCRIPTION OF THE DRAWINGS

This invention is more fully described in connection with the accompanying drawings in which.

DETAILED DESCRIPTION

Figure 1:
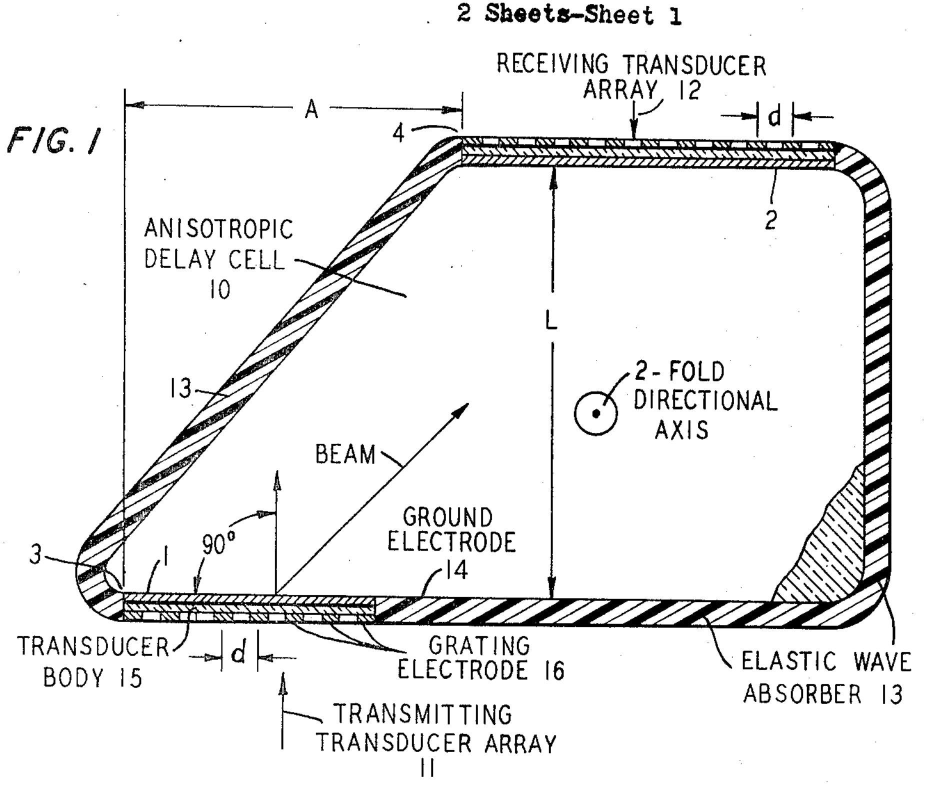
FIG. 1 is a schematic cross section of a dispersive delay cell in accordance with one embodiment of the invention.

In FIG. 1 there is shown a dispersive delay cell comprising a delay cell body 10 of a suitable anisotropic delay medium, a uniformly spaced transducer array 11 for launching an elastic wave signal into cell body 10 and a similar array 12 for receiving the wave signal transmitted through body 10. Each frequency component of the wave signal comprises radiation emerging from the transducer array in several different directions characterized as "lobes." The main lobe propagates in a direction normal to the array and the lobes traveling at an angle to this main lobe are designated as first order lobe, second order lobe, etc. according to increasing angle with the normal (see, for example, U.S. Pat. No. 3,401,360). Since only the first order lobe is utilized in the delay cell, absorber 13 is provided to absorb most of the energy in the other lobes and array 12 is positioned to receive only the first order lobe.

Delay cell body 10 is an anisotropic delay medium having a pair of suitably oriented parallel surfaces 1 and 2. The delay medium can, in general, be any anisotropic elastic wave supporting medium having a twofold axis of symmetry such that a shear wave polarized along the symmetry axis propagates in any direction normal to the axis in a pure mode (i.e., does not convert to a longitudinal wave) having a velocity which varies with the propagation direction. Advantageously, the medium has a pair of high and low velocity directions which are both perpendicular to each other and also perpendicular to the symmetry axis. Pure single cubic crystals, such as monocrystalline silicon crystals, and pure single hexagonal crystals, such as quartz, are examples of media which are useful for this purpose. In cubic crystals the (110) direction is the appropriate symmetry axis and in hexagonal crystals, the crystalline *a*-axis is the appropriate symmetry axis. The body is prepared for use as a delay cell by grinding a pair of surfaces 1 and 2 parallel to the symmetry axis which, in FIG. 1, is directed normal to the surface of the illustration.

Transducer array 11 comprises an array of uniformly spaced transducers chosen and oriented to launch into delay cell 10 a shear wave which is polarized parallel to the abovementioned symmetry axis. The array can conveniently comprise a common ground electrode 14, bonded and elastically coupled between one of the parallel faces 1 of delay cell body 10 and one surface of a transducer body 15. A uniformly spaced grating electrode 16 is disposed along the opposite surface of transducer body 15. Ground electrode 14 can be any good conductor which can be elastically coupled between the transducer and the delay medium without seriously distorting the passband characteristic of the signal to be transmitted. For example, in conjunction with a crystalline quartz delay medium, the ground electrode can include a thin layer of chromium for adherence and a layer of gold for good conductivity.

Transducer body 15 can be any one of the known piezoelectric crystals or polarized ceramics suitably cut or polarized to launch an elastic shear wave. For example, a Y-cut crystalline quartz transducer can be used with a quartz delay medium. The transducer body can be bonded to ground electrode 14 by well-known epoxy or cold diffusion bonding techniques.

Grating electrode 16 comprises a uniformly spaced array of elements having their long dimension parallel to the aforementioned symmetry axis of the delay medium. The spacing, *d*, between adjacent grating elements is typically greater than the elastic wavelength of the lowest frequency in the signal; however, it can be smaller in certain special cases. The width of each grating is, advantageously, about *d*/2 in order to maximize the radiated elastic wave power. The grating electrode can be conveniently formed by depositing a solid electrode, such as a composite layer including chromium and gold, on the transducer body, and photoetching to produce the grating structure. For high frequency applications, the spaced transducer array described in the copending application by I. E. Fair, Ser. No. 695,462, filed Jan. 3, 1968, and assigned to applicant's assignee, can be advantageously used.

Receiving array 12, which is similar to array 11, is disposed on parallel surfaces of delay cell 10. The outer edge 4, of array 12, is displaced relative to the outer edge 3 of array 11 and is elongated in order to enable it to receive essentially all of the first order lobe energy launched from array 11. In particular, the receiving array is displaced by a distance, A, approximately given by $$A=L\tan\left(\sin^{-1}\frac{\lambda_H}{d}\right)$$

where L is the distance between the transmitting and receiving surfaces, $\lambda_H$ is the wavelength of the highest frequency component in the input signal, and *d* is the spacing between adjacent grating elements. This equation is based on the approximation of a zero width for each grating element and a zero thickness for the transducer elements. In addition, the receiving array is long than the transmitting array by an amount approximately given by $L$ [tan (sin$^{11}$ $\lambda_{L/}d$)A $l$tan (sin$^{-1}\lambda$ ) ] where $\lambda_L$ is the wavelength of the lowest frequency component in the input signal.

In operation, an electromagnetic signal applied to transducer array 11 drives the transducer elements in phase to produce a multilobe elastic wave signal in the delay medium. Most of the energy in lobes other than the first order lobe is absorbed by absorber 13. The first order lobe, however, propagates in the anisotropic medium toward receiving array 12. Because of the interference effects produced by the spaced array of grating electrodes, the various frequency components of the signal in the first order lobe are launched in different directions and, since the material is anisotropic, will travel through the medium with different velocities. This dispersion mechanism can be more readily understood by reference to FIGS. 2A, 2B and 2C which illustrate the behavior of the first order lobe in typical anisotropic delay cells.

Figure 2A:
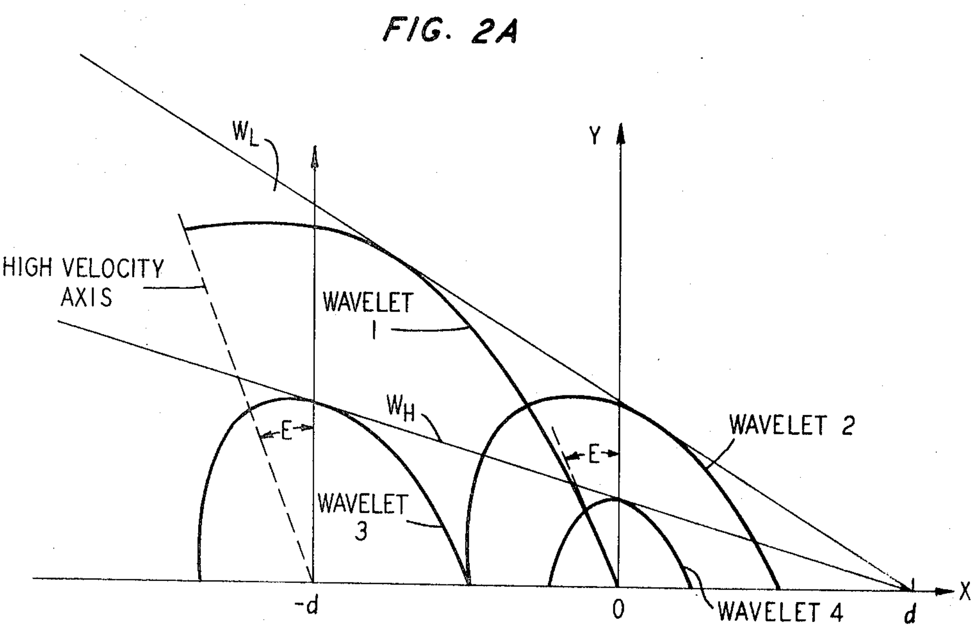
FIG. 2A, included for purposes of explanation, illustrates the formation of wavefronts as a function of frequency.

FIG. 2A illustrates the launching of two frequency components in the first order lobe in an anisotropic delay cell of the type shown in FIG. 1 having high and low velocity axes where the high velocity axis makes an angle, E, to the normal to the plane of the transmitting transducer array. The midpoints of three adjacent grating elements are identified along the X-direction axis as $-d$, 0 and $+d$. For the sake of illustration, the grating elements are shown as uniformly spaced. While a uniform spacing is peculiar to the present invention, it is not a necessary requirement to achieve dispersion. The Y-axis is normal to the array. The radiation from the grating is shown as elliptical Huygens wavelets rather than circular wavelets because of the anisotropy of the medium. Wavelets 1 and 2 represent the lowest frequency component after the elapse of two wave periods and one period, respectively. Similarly, wavelets 3 and 4 represent the highest frequency component after two periods and one period. The low and high frequency wavefronts, $W_L$ and $W_H$, are represented by the tangents to the low and high frequency wavelets, respectively.

Since the direction of propagation of a wave is perpendicular to its wavefront, it is clear from an examination of FIG. 2 that the low and high frequency components travel through the delay cell in different directions. Since the elastic wave velocity in the cell is dependent upon direction, the two components also travel with different velocities. Thus, the delay experienced by the different frequency components is direction dependent and, hence, frequency dependent.

Figure 2B:
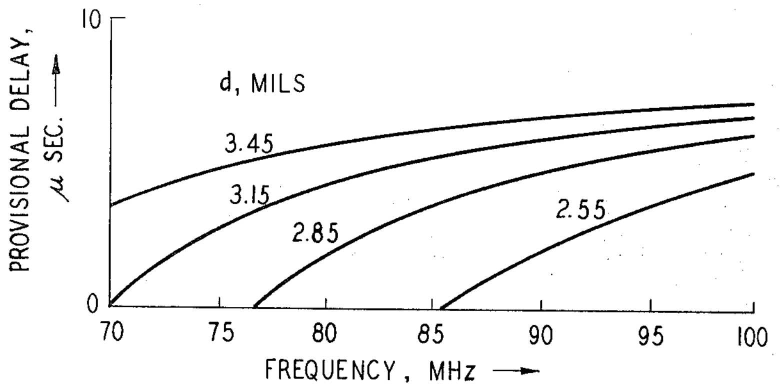
FIGS. 2B and 2C, included for purposes of explanation, show the relationship of the provisional delay and the provisional delay slope, respectively, as functions of frequency for the first order lobe.

The provisional delay, $$t=\frac{1}{2\pi}\frac{dp}{df}$$

where $dp/df$ is the rate of change of phase, $p$, with respect to frequency, $f$, provides a measure of the delay time of a delay cell. FIG. 2B is a graphical illustration of the provisional delay as a function of frequency for several anisotropic delay cells which differ only in the spacing, $d$, between adjacent transducer elements. In these delay cells, the distance, $L$,between the parallel surfaces is one inch; the high velocity axis of the delay medium makes an angle, E, of 30° with respect to the normal to the plane of the transducer; and the ratio between the highest velocity in the medium and the lowest velocity is 1.857. (One may notice that for small grating spacings, the provisional delay becomes zero at the lower frequencies. This zero value merely means that the propagation vector is parallel to the grating surface).

Figure 2C:
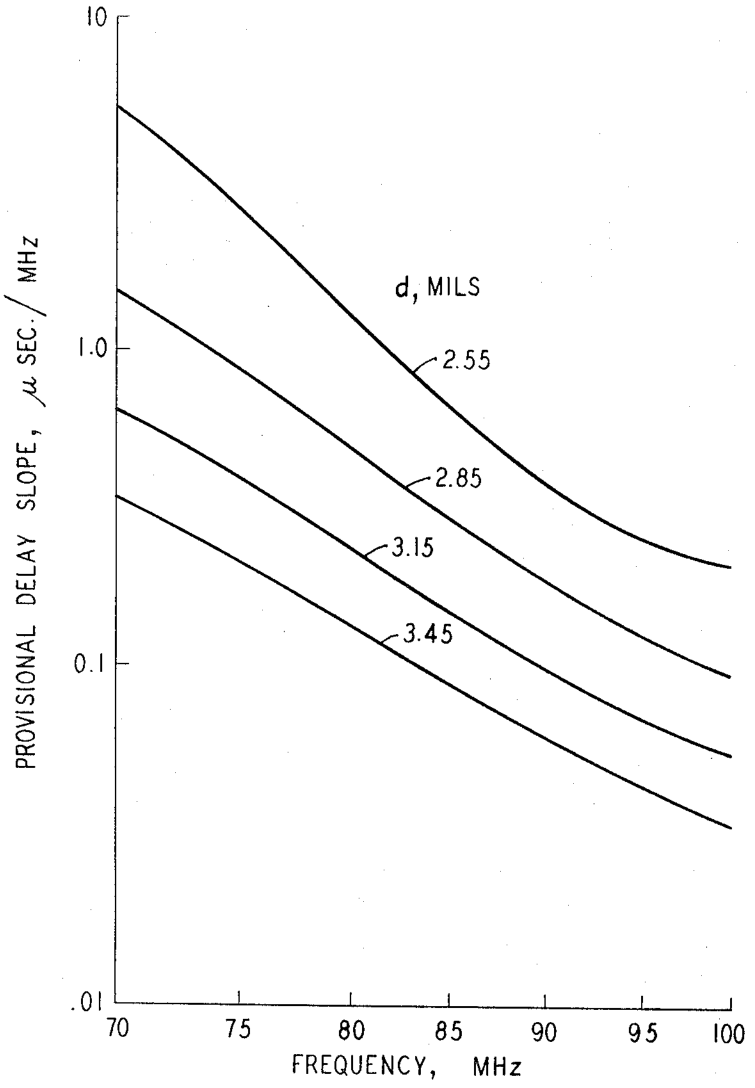

The provisional delay slope, $$s=\frac{1}{2\pi}\frac{d^2P}{df^2}$$

is a measure of the dispersive power of a delay cell. FIG. 2C graphically illustrates the provisional delay slope as a function of frequency for the same delay cells described in connection with FIG. 2B. On the basis of these curves, it was found that in all cases the delay slope was positive and proportional to powers of the frequency between $f^{1.3}$ and $f^{1.10}$. It is noteworthy that the slope achieved values as high as 0.5 microseconds per megahertz near 70 megahertz for the case where the provisional delay did not go to zero at or above this frequency (3.45 mils spacing).

It is understood that the above-described specific embodiment is illustrative of only one of the many possible specific embodiments which can represent applications of the principles of the invention. Numerous and varied other arrangements, particularly variations in the geometry of the delay cell, can be devised in accordance with these principles by those skilled in the art without departing from the spirit and scope of the invention.

I claim:

1. A dispersive delay cell comprising:

a body of an anisotropic elastic wave supporting medium characterized in that said medium has a symmetry axis such that elastic shear waves polarized along the direction of said axis propagate in any plane normal to the axis in a pure mode having a phase velocity which varies with the propagation direction in the normal plane;

means for launching elastic shear waves polarized along said axis into said body in several directions in the normal plane, depending on the frequency of the waves; and means for receiving said shear waves elastically coupled to said body.

2. A delay cell according to claim 1 wherein; said means for launching elastic shear waves is a spaced array of transducers.

3. A delay cell according to claim 1 wherein; said means for launching elastic shear waves is a uniformly spaced array of transducers.

4. A delay cell according to claim 1 wherein:

said body of anisotropic elastic wave supporting medium has a pair of parallel surfaces which are parallel to said symmetry axis; and wherein each of the means for launching and for receiving elastic shear waves comprises a uniformly spaced array of transducers disposed on different ones of said parallel surfaces.

5. A delay cell according to claim 1 wherein:

said body of anisotropic elastic wave supporting medium is a pure single cubic crystal; and said means for launching elastic shear waves launches a shear wave polarized in the (110) direction in said cubic crystal.

6. A delay cell according to claim 4 wherein said medium is monocrystalline silicon.

7. A delay cell according to claim 1 wherein:

said body of anisotropic elastic wave supporting medium is a pure single hexagonal crystal; and said means for launching elastic shear waves launches a shear wave polarized along the $a$ -axis of said hexagonal crystal.

8. A delay cell according to claim 4 wherein said medium is monocrystalline quartz.